United States Patent
So et al.

(10) Patent No.: US 6,742,819 B2
(45) Date of Patent: Jun. 1, 2004

(54) HOOD LATCH ASSEMBLY FOR FRONT END MODULE OF VEHICLE

(75) Inventors: Won-Sub So, Daejeon (KR); Dae-Bok Kwan, Daejeon (KR)

(73) Assignee: Halla Climate Control Corporation, Daejeon (KR)

( * ) Notice: Subject to any disclaimer, the term of this patent is extended or adjusted under 35 U.S.C. 154(b) by 0 days.

(21) Appl. No.: 10/282,088

(22) Filed: Oct. 29, 2002

(65) Prior Publication Data
US 2003/0080572 A1 May 1, 2003

(30) Foreign Application Priority Data
Oct. 30, 2001 (KR) .................. 10-2001-0067079

(51) Int. Cl.$^7$ ............................ E05C 3/16
(52) U.S. Cl. ........... 292/225; 292/336.3; 292/DIG. 14; 292/125; 403/348; 403/353; 74/502.4
(58) Field of Search ............... 74/502.4, 502.6; 403/348, 349, 263, 381, 353; 292/DIG. 14, 336.3, 225, 129

(56) References Cited

U.S. PATENT DOCUMENTS

| | | | |
|---|---|---|---|
| 3,393,579 A | | 7/1968 | Wolf |
| 4,023,435 A | * | 5/1977 | LaDue ................ 74/502.4 |
| 4,099,593 A | * | 7/1978 | Schultz ................ 180/289 |
| 4,850,084 A | * | 7/1989 | Iwasaki ................ 24/115 R |
| 5,138,898 A | * | 8/1992 | Pospisil et al. ........... 74/502.6 |
| 5,246,303 A | * | 9/1993 | Trilla et al. ............... 403/353 |
| 5,535,608 A | * | 7/1996 | Brin ....................... 70/256 |
| 5,836,061 A | * | 11/1998 | Castillo et al. ............ 24/702 |
| 6,361,091 B1 | * | 3/2002 | Weschler .............. 292/336.3 |
| 6,422,616 B1 | * | 7/2002 | Wortmann et al. ......... 292/216 |

FOREIGN PATENT DOCUMENTS

| | | |
|---|---|---|
| EP | 0 489 127 A1 | 6/1992 |
| EP | 1 142 742 A1 | 10/2001 |
| FR | 2478717 | 9/1981 |
| JP | 5-64372 | 2/1993 |
| JP | 2000-104430 | 4/2000 |
| JP | 2002-160670 | 5/2002 |

* cited by examiner

Primary Examiner—J. J. Swann
Assistant Examiner—Dinesh Melwani
(74) Attorney, Agent, or Firm—Lowe Hauptman Gilman & Berner LLP (57) ABSTRACT

A hood latch assembly for a front end module of a vehicle includes a hood latch, which locks a striker of a hood, installed at an upper horizontal portion of a front panel of the front end module formed of upper and lower horizontal portions and a vertical portion connecting the left and right sides of the upper and lower horizontal portions. The first release cable has one end connected to a release lever disposed at a driver's seat. The first release cable is installed at the upper horizontal portion of the front panel to be capable of sliding. A second release cable has one end connected to the hood latch. A connection unit is installed at the other end portions of the first and second release cables, which connects or separates the first and second release cables.

18 Claims, 9 Drawing Sheets

HOOD LATCH ASSEMBLY FOR FRONT END MODULE OF VEHICLE

BACKGROUND OF THE INVENTION

This application claims the priority of Korean Patent Application No. 2001-67079 filed Oct. 30, 2002 in the Korean Intellectual Property Office, the disclosure of which is incorporated herein in its entirety by reference.

1. Field of the Invention

The present invention relates to a hood latch assembly for a front end module of a vehicle, and more particularly, to a hood latch assembly for a front end module of a vehicle in which the structure of a cable adopted in a front end module of a vehicle is improved.

2. Description of the Related Art

Typically, a hood is installed in a vehicle to open and shut an engine room where an engine and other parts are installed. The hood is locked and unlocked to and from a body of the vehicle by a hood latch assembly. The locking and unlocking of the hood by the hood latch assembly are performed in multiple steps considering safety in handling.

An example of the hood latch assembly is disclosed in Japanese Patent Application Publication No. 2002-160670. The hood latch assembly includes a locking mechanism enabling a front end portion of a hood to be unlocked from a frame of a body of a vehicle and an unlocking cable extending from the locking mechanism and transmitting a manipulation force input from the outside to the locking mechanism to unlock the locking mechanism.

Japanese Patent Application Publication No. 2000-104430 discloses a hood lock structure for a vehicle having a two-step locking structure. Japanese Utility Model application Publication No. 1993-064372 discloses a hood latch assembly having a hood lock apparatus installed at a frame of a vehicle and coupled to a striker installed at an end portion of a hood and a release cable connecting the hood lock apparatus and a manipulation lever.

The conventional hood latch assembly or hood lock apparatus has a structure in which the hood lock apparatus and the release lever installed inside the vehicle are connected by a cable. As a vehicle has a variety of functions, and various additional apparatuses are installed in the engine room or the size of a vehicle increases, the length of the cable increases so that it is difficult to install and fix the cable connecting the release lever and the hood lock apparatus.

Recently, in manufacturing of vehicles, a front end module has been suggested so that apparatuses which are independently installed in the front side portion of a vehicle, for example, a cooling apparatus such as a radiator, a condenser, and a fan, a head lamp, a bumper, and a horn, can be made into a package and installed on a body frame by a one time work.

Figure 1:
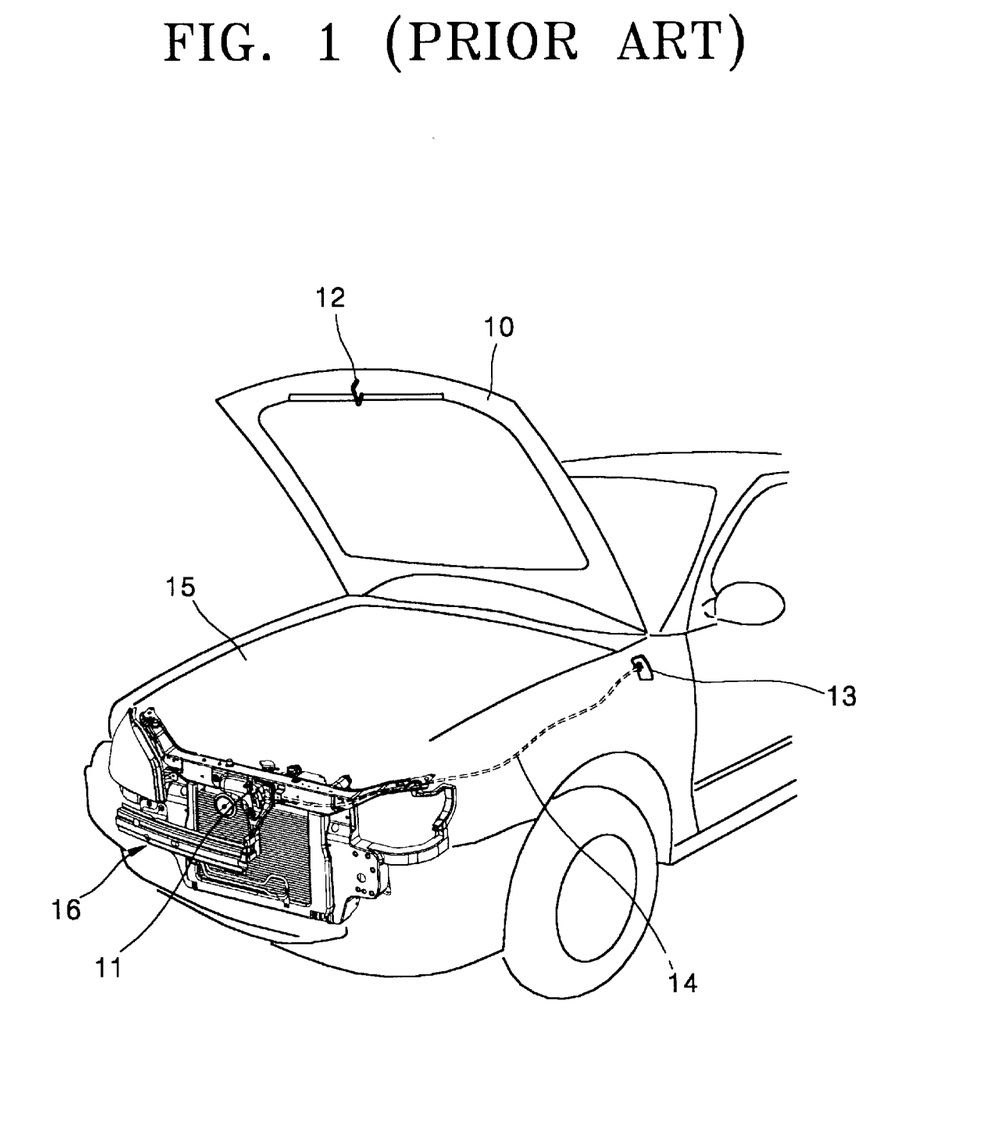
FIG. 1 is a perspective view illustrating the conventional front end module and the hood latch assembly installed thereto in a vehicle.

However, since in the front end module a hood latch 11 coupled to a striker 12 installed at an end portion of a hood 10 and a release cable 14 connecting a release lever 13 installed inside the vehicle form a single structure, as shown in FIG. 1, independency of the front end module 16 fixed to a body frame 15 in an independent package and an efficiency in an installation work are lowered. That is, the hood latch 11 is installed at the front end module 16 and the release lever 13 to manipulate the hood latch 11 is installed inside the vehicle, although the front end module 16 is independently packaged, its independency is lowered by the cable 14.

SUMMARY OF THE INVENTION

To solve the above and other problems, the present invention provides a hood latch assembly for the front end module of a vehicle which can improve independency of the front end module and facilitate installation thereof.

Also, the present invention provides a hood latch assembly for the front end module of a vehicle in which the release cable connecting the release lever and the hood latch can be separated and connected so that the release cable is easily installed and fixed.

According to an aspect of the present invention, a hood latch assembly for a front end module of a vehicle comprising a hood latch, which locks a striker of a hood, installed at an upper horizontal portion of a front panel of the front end module formed of upper and lower horizontal portions and a vertical portion connecting the left and right sides of the upper and lower horizontal portions, a first release cable, having one end connected to a release lever disposed at a driver's seat, installed at the upper horizontal portion of the front panel to be capable of sliding, a second release cable having one end connected to the hood latch, and a connection unit, installed at the other end portions of the first and second release cables, which connects or separates the first and second release cables.

Preferably, the connection unit comprises a fixture formed at the end portion of the first release cable and having a diameter greater than a diameter of the first release cable, and a hub formed at the end portion of the second release cable, which the fixture is coupled to and separated from.

Preferably, the hub comprises a body having a hollow portion into which the fixture is inserted, a cable insertion portion formed in the outer circumferential surface of the body to be capable of moving, into which the first release cable where the fixture is installed is inserted, and a fixture locking groove formed at an end portion of the cable insertion portion to accommodate the fixture.

Preferably, the connection unit comprises a first connection member installed at an end portion of the first release cable, and a second connection member rotatably installed at the end portion of the second release cable and screwed to the first connection member.

Preferably, the hood latch assembly further comprises a cable support unit which supports the first and second release cables with respect to the front panel of the front end module to be capable of moving in forward and backward directions.

According to another aspect of the present invention, a hood latch assembly for a front end module of a vehicle comprising a hood latch installed at the front end module installed at a body of the vehicle, a release lever installed inside the vehicle, and a release cable connecting the release lever and the hood latch and capable of being separated into a plurality of cables and coupled together by at least one connection unit.

BRIEF DESCRIPTION OF THE DRAWINGS

The above advantages of the present invention will become more apparent by describing in detail preferred embodiments thereof with reference to the attached drawings in which.

DETAILED DESCRIPTION OF THE INVENTION

Figure 2:
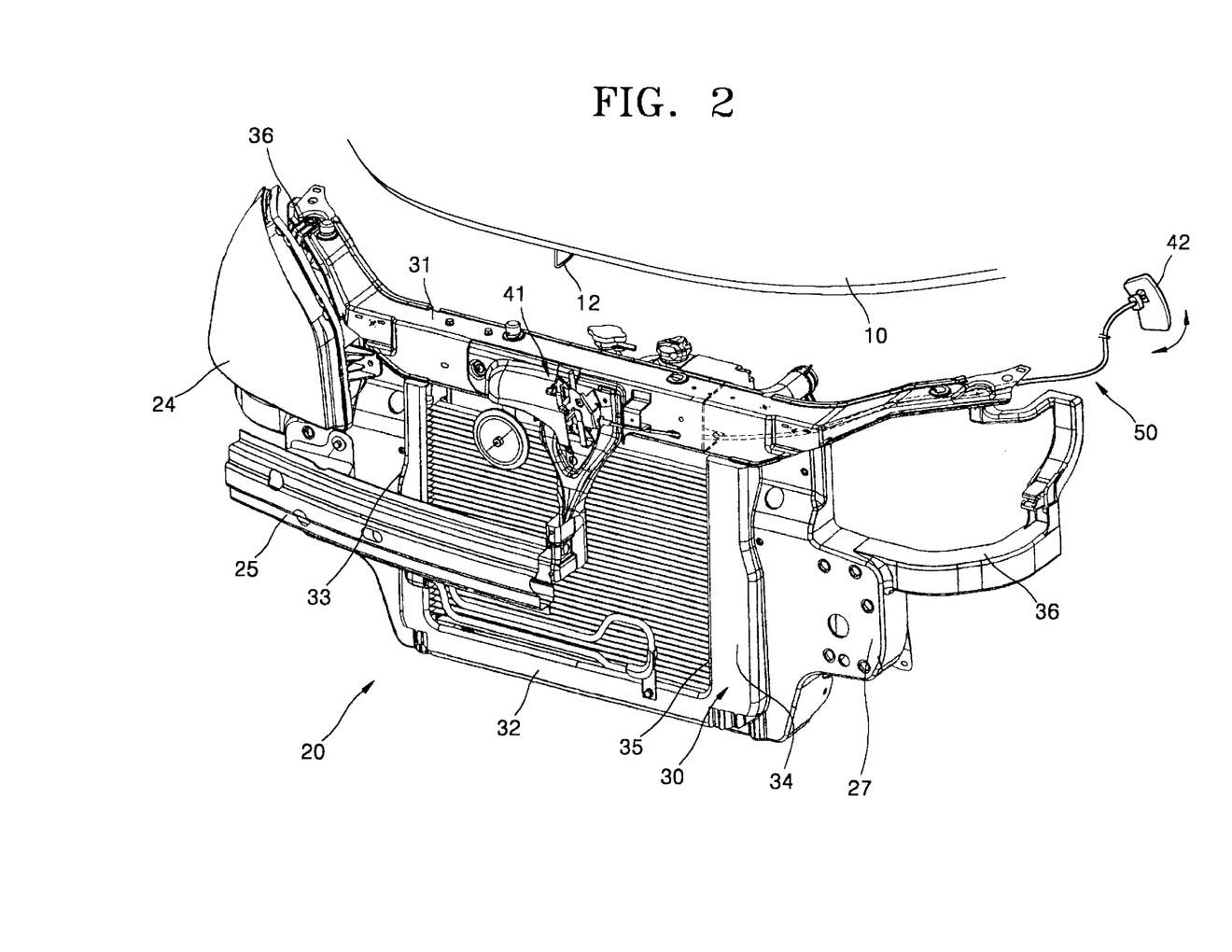
FIG. 2 is a perspective view illustrating a front end module having a hood latch assembly according to the present invention.
Figure 3:
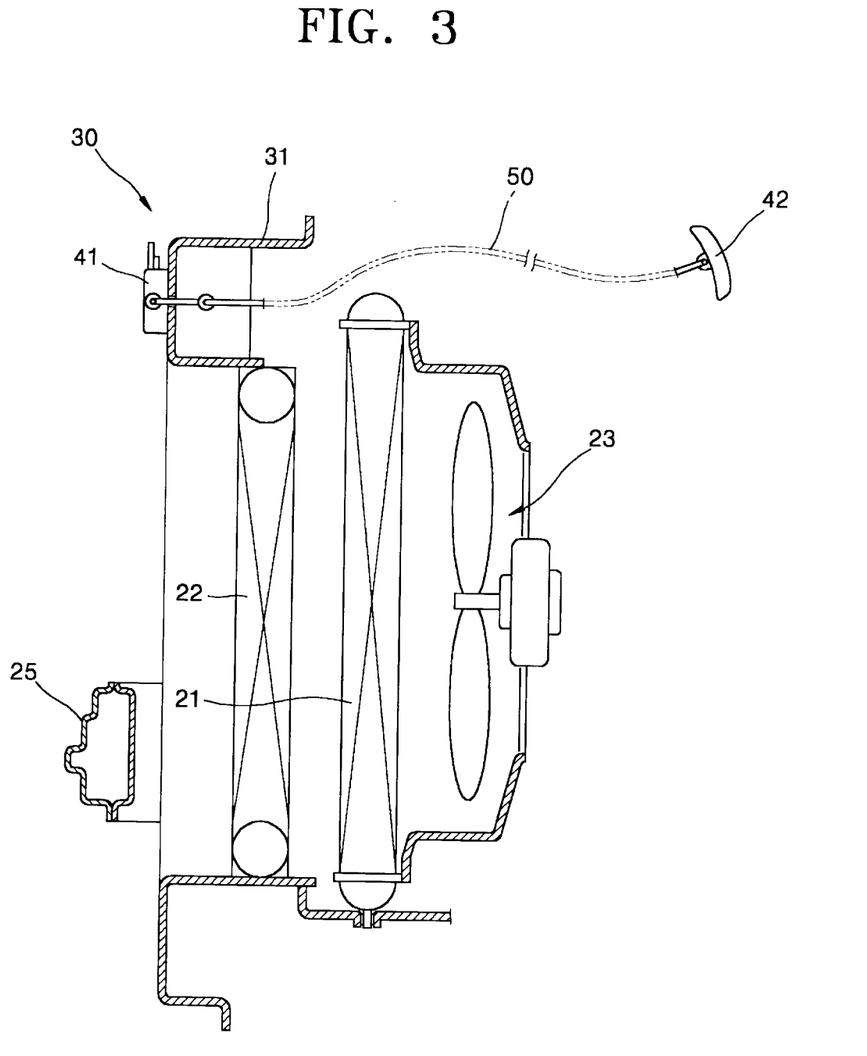
FIG. 3 is a vertical sectional view of the front end module showing a state in which the hood latch assembly according to the present invention is installed.
Figure 4:
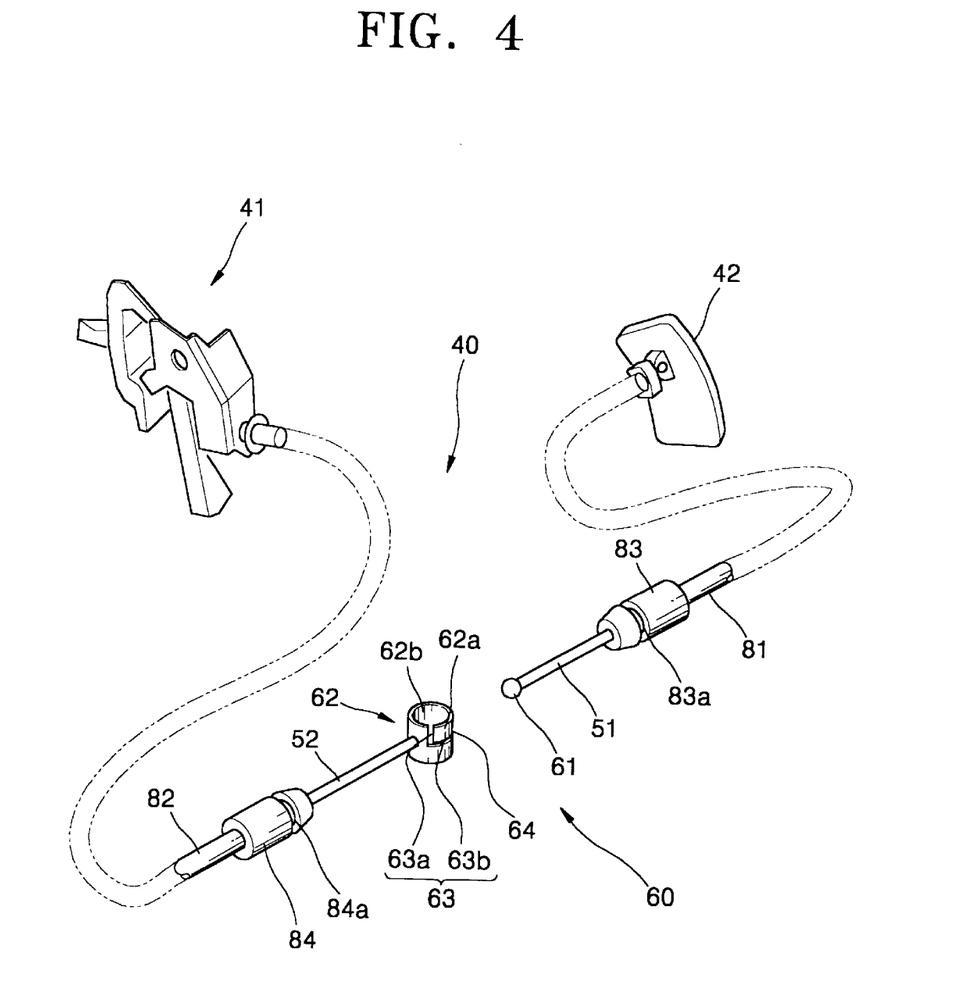
FIG. 4 is a partially cut-away perspective view illustrating the hood latch assembly according to the present invention.

Referring to FIGS. 2, 3, and 4, a hood latch assembly for a front end module of a vehicle according to the present invention includes a front panel 30, a cooling apparatus such as a radiator 21, a condenser 22, and a fan assembly 23 which are installed at the front panel 30, a front end module 20 having a head lamp 24 installed at the left and right ends of the front panel 30 and a bumper 25, and a hood latch assembly 40 installed at the front end module 20 to lock and unlock the hood 10.

The front panel 30 of the front end module 20 is an approximately rectangular frame formed of upper and lower horizontal portions 31 and 32 having the rear side that is open and vertical portions 33 and 34 connecting the left and right sides of the upper and lower horizontal portions 31 and 32, in which a cooling apparatus installation hole 35 is provided. A head lamp installation portion 36 to which left and right head lamps 24 are coupled and a bumper mounting portion 37 where a bumper 25 is installed are provided at the outside of the vertical portions 33 and 34. The profile of the upper horizontal portion 31 has a channel shape to reinforce rigidity.

The hood latch assembly 40 installed at the front end module 20 having the above structure, as shown in FIGS. 2 through 4, includes a hood latch 41 installed at the front surface of the upper horizontal portion 21 to lock and unlock the striker 12 of the hood 10, a release lever 42 installed at the driver's seat inside the vehicle, and a plurality of release cables 50, capable of being coupled and separated by at least one connection unit 60, connecting the release lever 42 and the hood latch 41 to deliver a manipulation force of the release lever 42 to the hood latch 41.

The release cable 50 includes a first release cable 51 having one end portion connected to the release lever 42, a second release cable 52 having one end portion connected to the hood latch 41, and the connection unit 60 installed at the other end portions of the first and second release cables 51 and 52 to connect and separate the first and second release cables 51 and 52. Here, the length of the first release cable 51 preferably has a length equal to or shorter than the length of the end portion of the upper horizontal portion 31 from the hood latch 41.

The connection unit 60 includes a fixture 61 installed at the other end portion of the first release cable 51 and having a diameter greater than that of the first release cable 51 and a hub 62 installed at the other end portion of the second release cable 52 to be capable of being coupled to and separated from the fixture 61. The shape of the fixture 61 is not limited to a ball shape.

The hub 62 coupled to the fixture 61 has a body 62a having a hollow portion 62b. A cable insertion portion 63 is formed at one side of the body 62a by cutting a predetermined length from an end portion of the body 62a so that the first cable 51 having the fixture 61 can move. A fixture locking groove 64 where the fixture 61 is accommodated is formed at an end portion of the cable insertion portion 63. The cable insertion portion 63 has a width greater than the diameter of the second release cable 52 and less than the diameter of the fixture 61. To prevent escape of the cable coupled to the cable insertion portion 63, the cable insertion portion 63 includes a first insertion portion 63a formed in the lengthwise direction of the hub 62 and a second insertion portion 63b formed in the circumferential direction of the hub 62, extending from the first insertion portion 63a and connected to the fixture locking groove 64. The first insertion portion 63a is preferably formed in a vertical direction, that is, in the lengthwise direction of the hub 62. The second insertion portion 63b is preferably formed in a horizontal direction, that is, in the circumferential direction of the hub 62. Thus, escape of the fixture 61 is preferably made to be difficult.

Figure 5:
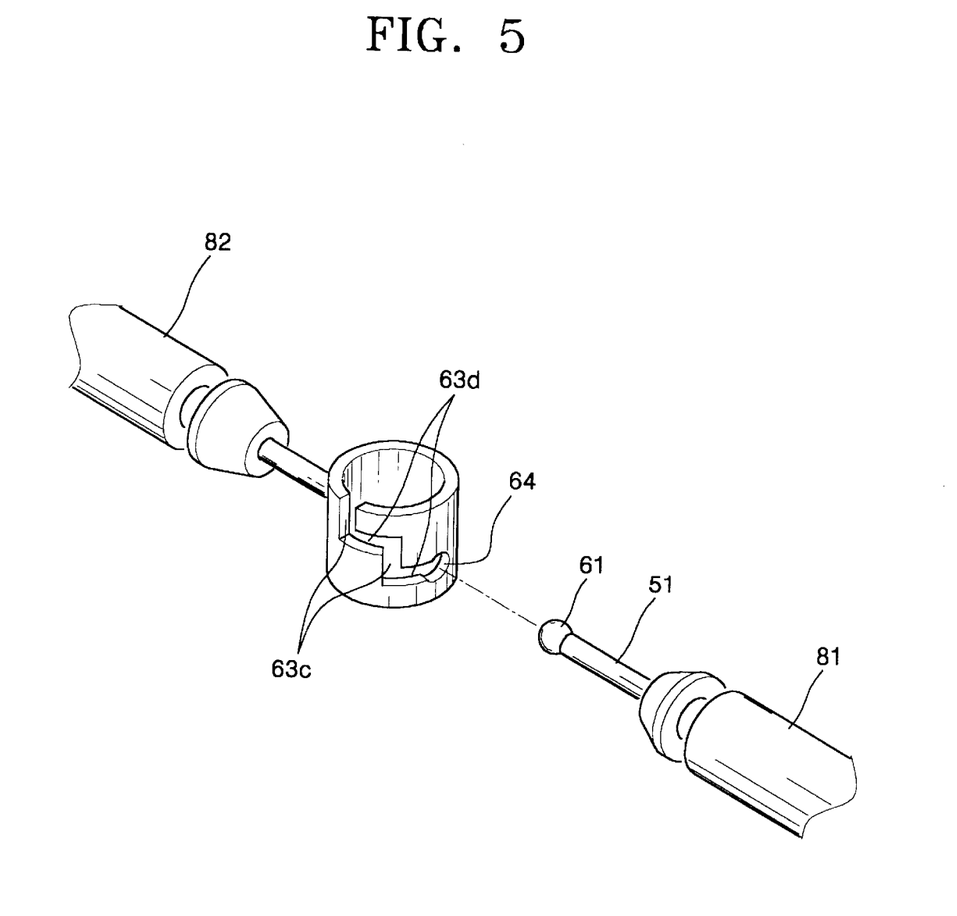
FIG. 5 is a perspective view illustrating another preferred embodiment of a connection unit.

The cable insertion portion 63 is not limited to the above-described preferred embodiment and any structures in which a cable inserted in the cable insertion portion 63 is not separated in the state of no artificial force being applied may be adopted therefor. For example, as shown in FIG. 5, the first insertion portion 63c and the second insertion portion 63d can be formed of multiple steps.

Figure 6:
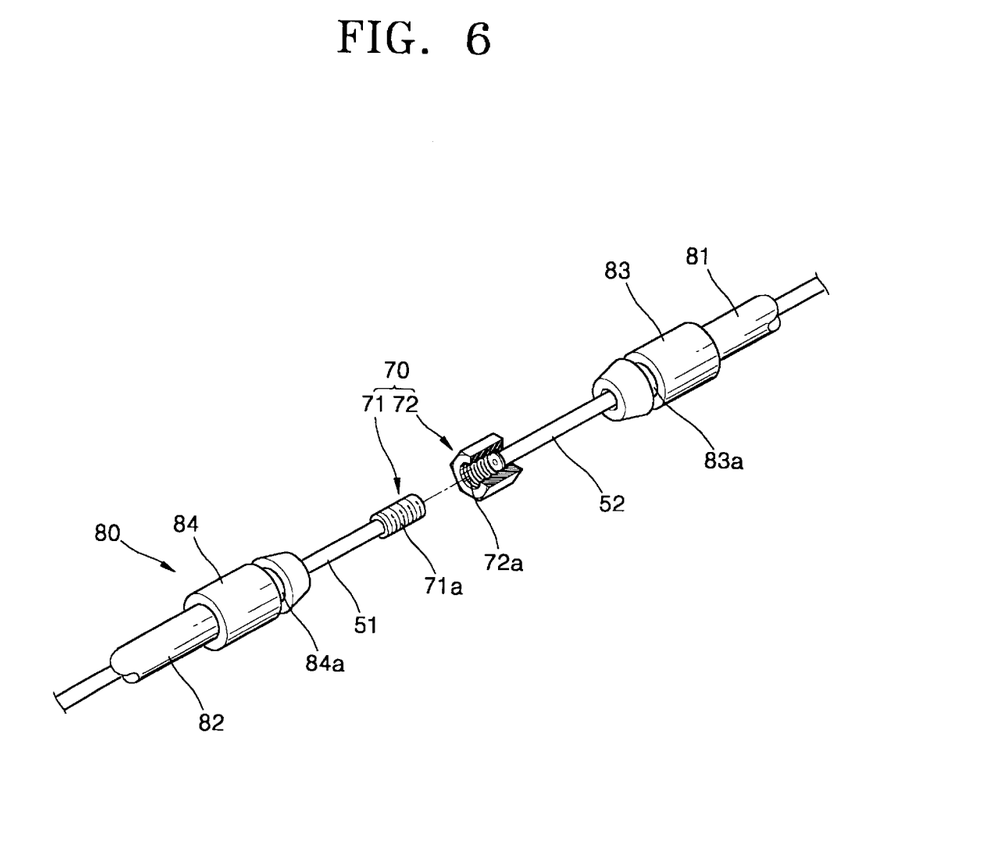
FIG. 6 is a perspective view illustrating another example of the connection unit of a release cable applied to the hood latch assembly according to the present invention.

FIG. 6 shows another preferred embodiment of the connection unit connecting the first and second release cables.

Figure 7:
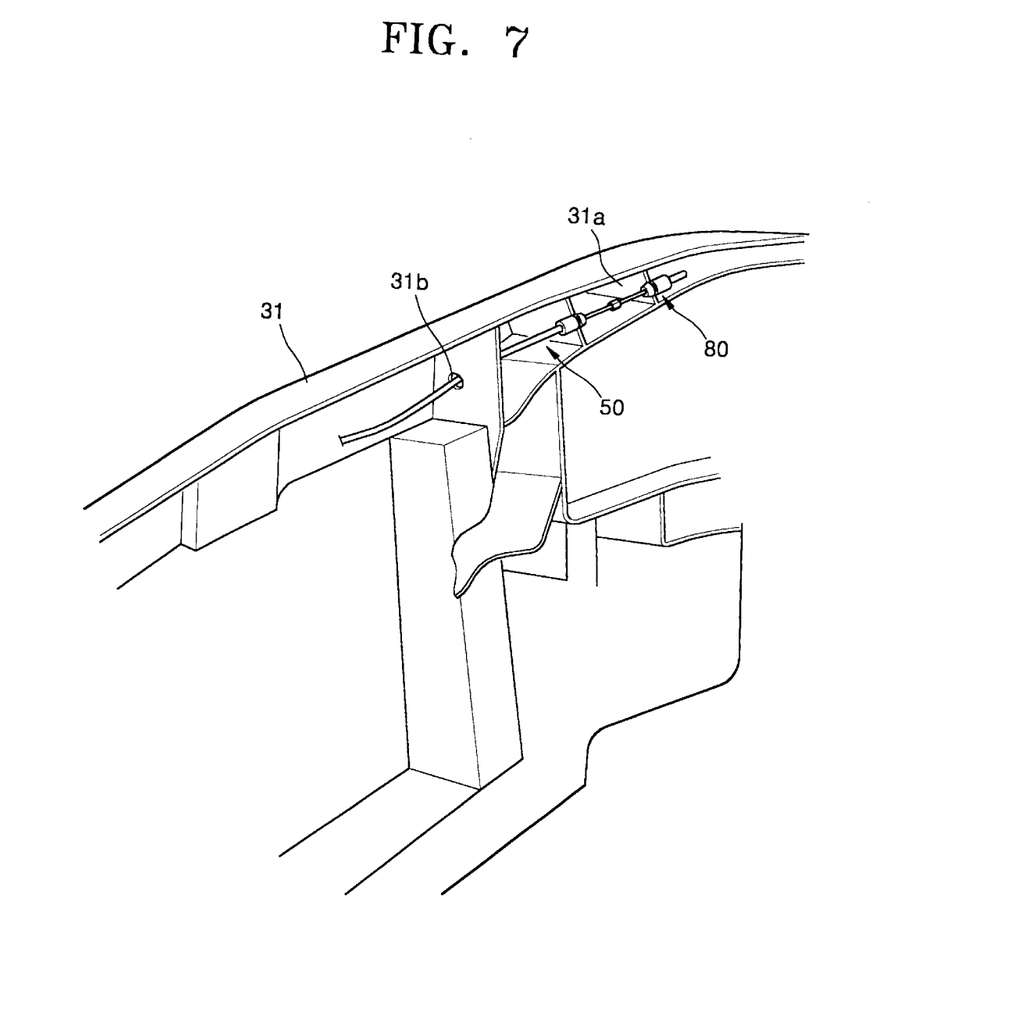
FIG. 7 is a perspective view illustrating a state in which the release cable is installed at an upper horizontal portion of a front panel.

Referring to the drawing, a connection unit 70 includes a first connection member 71 installed at an end portion of the first release cable 51 at the release lever 42 and a second connection member 72 rotatably installed at an end portion of the second release cable 52 at the release lever 42 and screwed to the first connection member 71. A male thread portion 71a is formed on the outer circumferential surface of the first connection member 71 while a female thread portion 72a coupled to the first connection member 71 is formed on the inner circumferential surface of the second connection member 72. In the above preferred embodiments, as shown in FIG. 7, a reinforcement rib 31a is formed at the rear surface of the upper horizontal portion 31 and the first release cable 51 connected to the release lever 42 can be supported by a guide hole 31b formed in the reinforcement rib 31a.

In the meantime, the first release cable 51 and the second release cable 52 further include a support unit 80 enabling the cables to slide with respect to the front panel 30 of the front end module 20.

Figure 8:
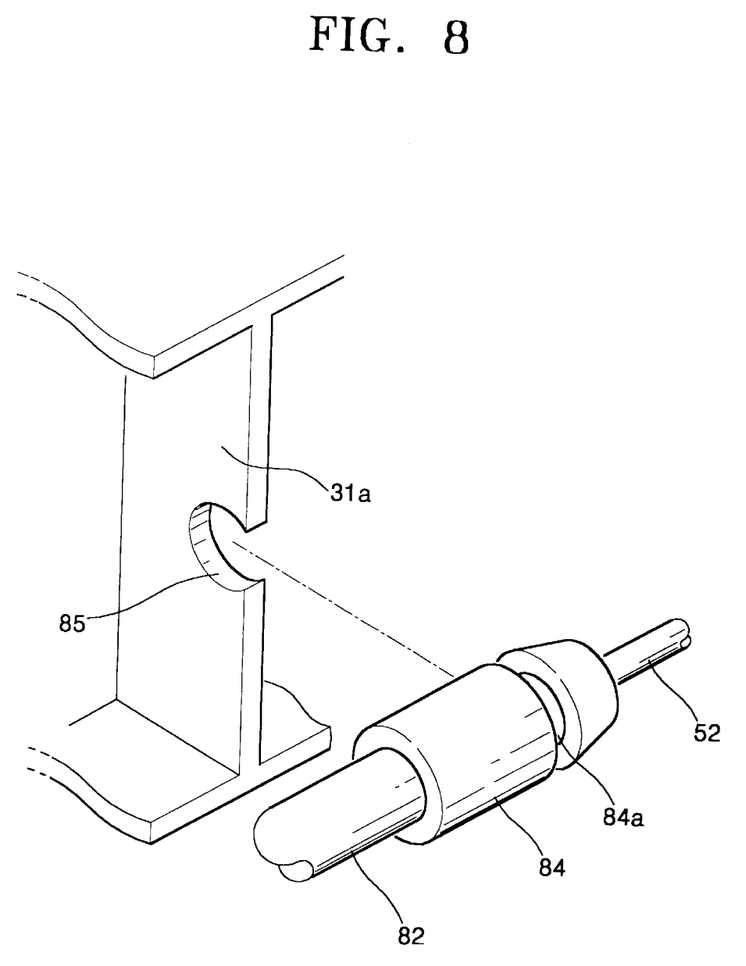
FIG. 8 is an enlarged perspective view illustrating a state in which the release cable is supported by the front panel.

The support unit 80, as shown in FIGS. 4 through 7, includes outer coats 81 and 82 into which the first and second release cables 51 and 52 are inserted and cable support members 83 and 84 installed at end portions of the cable support members 83 and 84. Guide grooves 83a and 84a are formed at the outer circumferential surfaces of the cable support members 83 and 84, respectively, and the cable support members 83 and 84 are coupled to the insertion groove 85 formed in the reinforcement rib 31a, as shown in FIG. 8.

Figure 9:
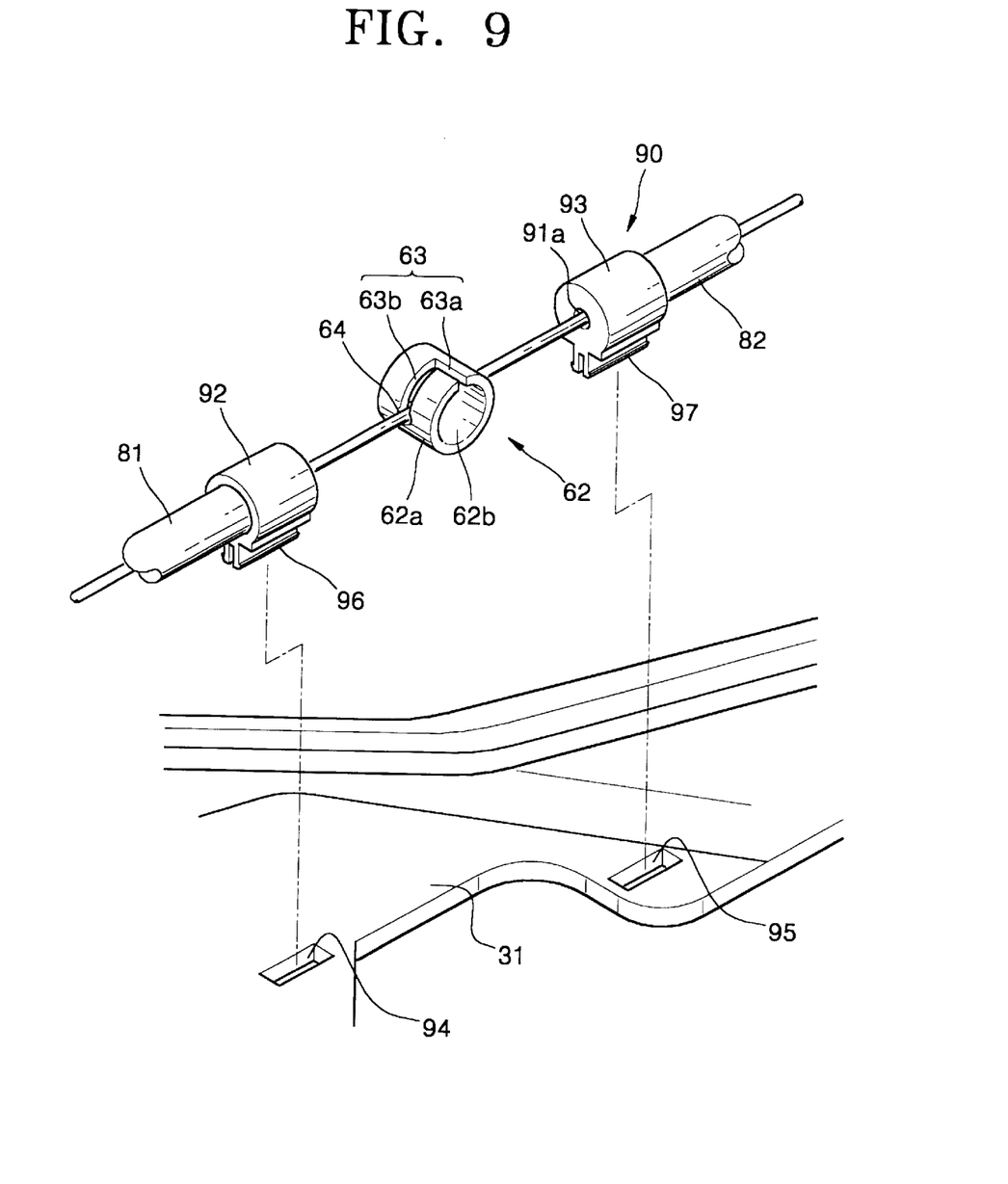
FIG. 9 is a perspective view illustrating a support unit of the hood latch cable.

FIG. 9 shows another preferred embodiment of the support unit supporting the first and second release cables 51 and 52.

Referring to the drawing, a support unit 90 supporting the first and second release cables 51 and 52 has cable fixing members 92 and 93 having through holes 91 through which the cables pass and provided at end portions of the first and second cables 51 and 52. The cable fixing members 92 and 93 respectively include hooks 96 and 97 which are coupled to coupling holes 94 and 95 formed in the bottom portion of the upper horizontal portion 31 of the front panel 30. Here, the cable fixing members 92 and 93 may be installed at the outer coats 81 and 82 enclosing the first and second release cables 51 and 52.

The operation of the hood latch assembly for a front end module of a vehicle according to the present invention will now be described.

A cooling apparatus such as the radiator 21, the condenser 22, and the fan 23, the head lamp 24, and the bumper 25 are coupled to the front panel 30. The hood latch 41 is installed at the front surface of the upper horizontal portion 31 of the front panel 30. The first cable 51 connected to the release lever 42 is supported by the guide hole 31b in the upper horizontal portion 31, or the fixture 61 or the cable support members 83 and 84 of the support unit 80.

The front end module 20 completed as above is installed at the front portion of the body of the vehicle. The first release cable 51 is connected to the second release cable 52 by the connection unit 60. In the connection of the first and second release cables 51 and 52 using the connection unit 60, the fixture 61 of the first release cable 51 is inserted into the hollow portion 62b of the hub 62 of the second release cable 52 and simultaneously the first release cable 51 is inserted into the first insertion portion 63a of the cable insertion portion 63. Then, the first release cable 51 is moved to the second insertion portion 63b and the fixture 61 is accommodated in the fixture locking groove 64.

When the release lever 42 is manipulated to open the hood 10, the first release cable 51 of the release cable 50 is moved backward. As the first release cable 51 is moved, the second release cable 52 is also moved backward. The second release cable 52 is moved backward along the guide hole 31b of the vertical rib 31a to operate the hood latch 41 so that the hood 10 is primarily opened. The primarily opened hood 10 can be completely opened by pivoting a second lever (not shown) installed at the hood latch 41, although which is not shown in the drawings.

In the meantime, when the front end module 20 is separated from the body of a vehicle to repair the front end module 20, the first release cable 51 is separated from the locking groove 64 of the hub 62 of the second release cable 52 to separated the first release cable 51 from the hub 62 through the cable insertion portion 63. Then, the fixture 61 is separated from the hollow portion 62b of the hub 62 to separate the first and second release cables 51 and 52.

Since the first and second release cables 51 and 52 are supported by the cable insertion portion 63 or the cable support members 83 and 84, which are supporting means, the cables are prevented from being shaken or the manipulating force is prevented from being lowered.

As described above, in the hood latch assembly for a front end module of a vehicle according to the present invention, since the hood latch release cable is divided into two cables, when the hood latch assembly is applied to the front end module, the hood latch assembly can be easily installed. In particular, independency of a front end module package can be improved.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A hood latch assembly for a front end module of a vehicle, said hood latch assembly comprising:
    a hood latch for lockingly engaging a striker of a hood of said vehicle, said hood latch being installed at an upper horizontal portion of a front panel of the front end module, said front panel being formed of said upper horizontal portion, a lower horizontal portion and at least one vertical portion connecting the upper and lower horizontal portions;
    a first release cable having opposite end portions one of which is connected to a release lever;
    a second release cable having opposite end portions one of which is connected to the hood latch;
    a connection unit installed at the other end portions of the first and second release cables, the first and second release cables being detachably connected by said connection unit; and
    a cable support unit which supports the first and second release cables on the front panel of the front end module so that said first and second release cables are slidable with respect to said front panel;
    wherein the cable supporting unit has at least a cable support member having a through hole, through which the cables slidably pass, and being supported by a reinforcement rib of the front panel.

2. The hood latch assembly as claimed in claim 1, wherein the connection unit comprises:
    an enlarged portion formed at the other end portion of the first release cable and having a diameter greater than a diameter of the first release cable; and
    a hub formed at the other end portion of the second release cable, said hub and said enlarged portion being detachably engaged with each other.

3. The hood latch assembly as claimed in claim 2, wherein the hub comprises:
    a body having a hollow portion into which the enlarged portion is inserted;
    a cable insertion portion formed in the outer circumferential surface of the body into which the end portion of the first release cable provided with the enlarged portion is inserted; and
    a locking groove formed in an end region of the cable insertion portion to accommodate the enlarged portion.

4. The hood latch assembly as claimed in claim 3, wherein the cable insertion portion comprises:
    a first insertion portion cut in a lengthwise direction to the body; and
    a second insertion portion extending from one end of the first insertion portion in a circumferential direction of the hub.

5. The hood latch assembly as claimed in claim 4, wherein the first insertion portion and the second insertion portion are formed of multiple steps.

6. The hood latch assembly as claimed in claim 3, wherein a width of the cable insertion portion is greater than the diameter of the first release cable and less than the diameter of the enlarged portion.

7. The hood latch assembly as claimed in claim 4, wherein a width of the cable insertion portion is greater than the diameter of the first release cable and less than the diameter of the enlarged portion.

8. The hood latch assembly as claimed in claim 1, wherein the connection unit comprises:
  a first connection member installed at the other end portion of the first release cable; and
  a second connection member rotatably installed at the other end portion of the second release cable and screwed to the first connection member.

9. The hood latch assembly as claimed in claim 1, wherein a guide groove formed in an outer circumferential surface of the cable support member is engaged with a rim of a cutout formed in the reinforcement rib.

10. The hood latch assembly as claimed in claim 1, wherein the cable support unit comprises:
  a fixing member having an open portion supporting the cable to be capable of sliding; and
  a hook formed at the fixing member and coupled to a coupling hole of the front panel.

11. A hood latch assembly for a front end module of a vehicle, said hood latch assembly comprising:
  a hood latch installed at the front end module of the vehicle;
  a release lever installed inside the vehicle; and
  a release cable connecting the release lever and the hood latch, said release cable comprising at least first and second segments detachably coupled together by at least one connection unit;
  wherein the connection unit comprises:
    an enlarged portion formed at an end portion of the first segment and having a diameter greater than a diameter of the release cable in the first segment;
    a hub formed at an end portion of the second segment, said hub and said enlarged portion being detachably engaged with each other;
    wherein the hub comprises:
      a hollow body in which the enlarged portion is received;
      a slot extending through a wall of said hollow body, having opposite ends one of which is open to an end of said hollow body, and having a width greater than the diameter of the release cable in the first segment to allow the first segment of said release cable to pass through; and
      a locking groove formed at the other end of said slot, said locking groove having a width greater than the width of said slot but smaller than the diameter of the enlarged portion.

12. The hood latch assembly as claimed in claim 11, wherein the first segment is connected to the release lever; and the second segment is connected to the hood latch.

13. The hood latch assembly as claimed in claim 11, wherein the connection unit comprises: a first connection member installed at an end portion of the release cable connected to the release lever; and a second connection member rotatably installed at an end portion of the release cable connected to the hood latch and screwed to the first connection member.

14. The hood latch assembly as claimed in claim 12, further comprising a cable support unit which supports the first and second segments on the front end module so that said first and second segments are slidable with respect to said front end module.

15. The hood latch assembly as claimed in claim 14, wherein the slot has a stepwise configuration.

16. The hood latch assembly as claimed in claim 14, wherein the cable supporting unit has at least first and second cable support members having through holes, through which the first and second segments of the release cable slidably pass, respectively, and being supported by reinforcement ribs of the front end module, said connection unit being located between said cable support members.

17. The hood latch assembly as claimed in claim 16, wherein a guide groove is formed in an outer circumferential surface of each of the cable support members and is engaged with a rim of a cutout formed in the respective one of the reinforcement ribs.

18. The hood latch assembly as claimed in claim 17, wherein a cable length between the connection unit and at least the second cable support member is significantly smaller than a cable length of the second segment being supported by said second cable support member.

* * * * *